US009323998B2

(12) United States Patent
Berger et al.

(10) Patent No.: US 9,323,998 B2
(45) Date of Patent: Apr. 26, 2016

(54) METHOD FOR IDENTIFYING POSTAL MAILINGS

(75) Inventors: Gisbert Berger, Berlin (DE); Katja Worm, Berlin (DE); Wolf-Stephan Wilke, Constance (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 1124 days.

(21) Appl. No.: 11/991,057

(22) PCT Filed: Aug. 11, 2006

(86) PCT No.: PCT/EP2006/007938
§ 371 (c)(1),
(2), (4) Date: Feb. 26, 2008

(87) PCT Pub. No.: WO2007/022876
PCT Pub. Date: Mar. 1, 2007

(65) Prior Publication Data
US 2009/0285486 A1     Nov. 19, 2009

(30) Foreign Application Priority Data
Aug. 26, 2005 (DE) .......................... 10 2005 040 689

(51) Int. Cl.
*G06K 9/20* (2006.01)
*B07C 3/10* (2006.01)

(52) U.S. Cl.
CPC ................ *G06K 9/2063* (2013.01); *B07C 3/10* (2013.01)

(58) Field of Classification Search
USPC ........................................................ 382/101
See application file for complete search history.

(56) References Cited

U.S. PATENT DOCUMENTS

| 4,797,937 | A | * | 1/1989 | Tajima ........................... 382/101 |
| 5,031,223 | A | | 7/1991 | Rosenbaum et al. |
| 5,043,908 | A | | 8/1991 | Manduley et al. |
| 5,535,127 | A | * | 7/1996 | Uno et al. ...................... 705/406 |
| 5,563,955 | A | * | 10/1996 | Bass et al. ...................... 382/101 |
| 5,581,628 | A | * | 12/1996 | Nakamura et al. ............. 382/101 |
| 5,734,723 | A | * | 3/1998 | Windel et al. ................... 380/55 |
| 5,745,590 | A | * | 4/1998 | Pollard .......................... 382/101 |
| 5,822,455 | A | * | 10/1998 | Sano et al. ..................... 382/202 |
| 6,208,910 | B1 | | 3/2001 | Michael et al. |

(Continued)

FOREIGN PATENT DOCUMENTS

DE    40 00 603 A1    7/1991
DE    19947259 C1    9/2000

(Continued)

OTHER PUBLICATIONS

Derwent Abstract—DE 40 00 603 A1; Jul. 18, 1991; Licentia Patent-Verwaltungs-GmbH, D-6000 Frankfurt, Germany.

(Continued)

*Primary Examiner* — Ishrat I Sherali
(74) *Attorney, Agent, or Firm* — Laurence Greenberg; Werner Stemer; Ralph Locher

(57) ABSTRACT

A method for identifying postal mailings includes registering the mailings by means of at least one recognizable pictorial feature and at least one external information item, or both. Further, the method includes carrying out recognition of the pictorial feature to identify a mailing, and if identification is incomplete, performing identification using the external information item.

11 Claims, 3 Drawing Sheets

(56) References Cited

U.S. PATENT DOCUMENTS

| | | | |
|---|---|---|---|
| 6,240,196 B1* | 5/2001 | Fischer et al. | 382/100 |
| 6,279,750 B1 | 8/2001 | Lohmann | |
| 6,427,021 B1* | 7/2002 | Fischer et al. | 382/101 |
| 6,594,374 B1* | 7/2003 | Beckstrom et al. | 382/101 |
| 6,665,422 B1* | 12/2003 | Seidel et al. | 382/101 |
| 6,703,574 B1 | 3/2004 | Kechel et al. | |
| 6,888,084 B1 | 5/2005 | Bayer | |
| 7,035,428 B1* | 4/2006 | Smith | 382/101 |
| 7,081,595 B1* | 7/2006 | Brandt et al. | 209/584 |
| 7,415,131 B2* | 8/2008 | Mampe et al. | 382/101 |
| 7,674,995 B2 | 3/2010 | Desprez et al. | |
| 2001/0032881 A1 | 10/2001 | Wells et al. | |
| 2004/0263901 A1* | 12/2004 | Critelli et al. | 358/1.15 |
| 2005/0105767 A1* | 5/2005 | Rosenbaum et al. | 382/101 |
| 2005/0123170 A1 | 6/2005 | Desprez et al. | |
| 2005/0131840 A1* | 6/2005 | Pintsov et al. | 705/401 |
| 2005/0209977 A1 | 9/2005 | Avant et al. | |
| 2005/0249376 A1* | 11/2005 | Leo et al. | 382/101 |
| 2005/0269395 A1 | 12/2005 | Miette et al. | |
| 2007/0215529 A1 | 9/2007 | Desprez et al. | |
| 2008/0149540 A1 | 6/2008 | Olivier et al. | |
| 2009/0076649 A1 | 3/2009 | Berger et al. | |
| 2009/0285486 A1 | 11/2009 | Berger et al. | |
| 2010/0111356 A1 | 5/2010 | Berger et al. | |

FOREIGN PATENT DOCUMENTS

| | | |
|---|---|---|
| DE | 102005040689 A1 | 3/2007 |
| EP | 0948416 B1 | 11/2001 |
| EP | 1222037 B1 | 6/2003 |
| EP | 1 389 493 A1 | 2/2004 |
| FR | 2881663 A1 | 8/2006 |
| WO | 0062332 A1 | 10/2000 |
| WO | 2006100357 A1 | 9/2006 |
| WO | 2007022876 A1 | 3/2007 |

OTHER PUBLICATIONS

Derwent Abstract—EP 1 389 493 A1; Feb. 18, 2004; MIT Management intelligenter Technologien GmbH, D-52076 Aachen, Germany.

* cited by examiner

METHOD FOR IDENTIFYING POSTAL MAILINGS

CROSS-REFERENCE TO RELATED APPLICATIONS

The present application is a national stage application of International Application No. PCT/EP2006/007938, filed on Aug. 11, 2006, which claims priority to German Patent Application No. 10 2005 040 689.0, filed on Aug. 26, 2005, both of which are incorporated herein by reference.

BACKGROUND OF THE INVENTION

The invention relates to a method for identifying for example postal mailings.

Certain applications require a pictorial identification of objects. The invention is described by way of example for objects in postal processes, such as sorting processes, in which mailings are generally involved.

SUMMARY OF THE INVENTION

The object of the invention is to specify a fast method for the reliable identification of postal mailings.

A method for identifying postal mailings is hereby described, in which:
 the mailings are first respectively registered by means of at least one recognizable pictorial feature and/or by means of at least one external information item,
 recognition of the pictorial feature is then carried out to identify a mailing and if identification is incomplete, a further identification step is included using the external information item.

In this process the recognition of one or more pictorial features should be associated with minimal outlay, so that the associated identification of a mailing initially takes place easily and quickly.

Such pictorial features can be a frame for a text field, a colored logo, a category of stamp print, etc.

If this/these first recognition operation(s) fail(s) to result in identification of the mailing, since mass mailings have the same category of stamp print for example, at least one further external information item registered prospectively in a database is used as a further aid or discriminator for identification of the mailings.

It is possible to use different types of external information items in this process.

They can be data input manually during registration. For example before the sorting process for a mass mailing type, the position of the address field (which is identical on each mailing of this type) is input manually by an operator. This information is stored as each mailing is registered. During the later identification of a mailing, the position of the address block on the mailing candidates in question is then already known and can be included in the identification. Such a further externally input feature has the advantage of being simple and, as with the above pictorial features, ensures fast discrimination between or identification of mailings. External information items that refer to discriminating regions are generally very suitable.

Likewise selected external information items can comprise coded or readable data, e.g. ID codes, bar codes, 2D codes, RFID tags or text fields (e.g. delivery address, sender). Because such data has to be decoded or interpreted, the outlay for recognizing a registered ID code result or a registered address is greater but still valuable, if the error rate for identifications has to be kept to a minimum at the expense of time.

The form of registration of the pictorial features and external information items as feature vectors in a database is a particularly major advantage, as these can be called up in a flexible manner during identification depending on the outlay for recognition of the pictorial images or for the included information step of external information items.

Pictorial features and external information can also be included in the mailing-related feature vector in such a sequence that their use in identifying a mailing is associated with minimal recognition outlay. As a result the simpler and faster discriminators are preferred.

It is also possible to take into account or register as new possible changes, removals or additions of pictorial features and external information items between registration and identification, preferably applying a divert address, at least a bar code, at least a 2D code, an RFID code, at least a sticker, at least a stamp print or other cancellations. This makes it possible to use further types of aid to identify the mailings.

BRIEF DESCRIPTION OF THE SEVERAL VIEWS OF THE DRAWINGS

An exemplary embodiment of the invention is described below with reference to the drawings, in which.

DETAILED DESCRIPTION OF THE INVENTION

Figure 1:
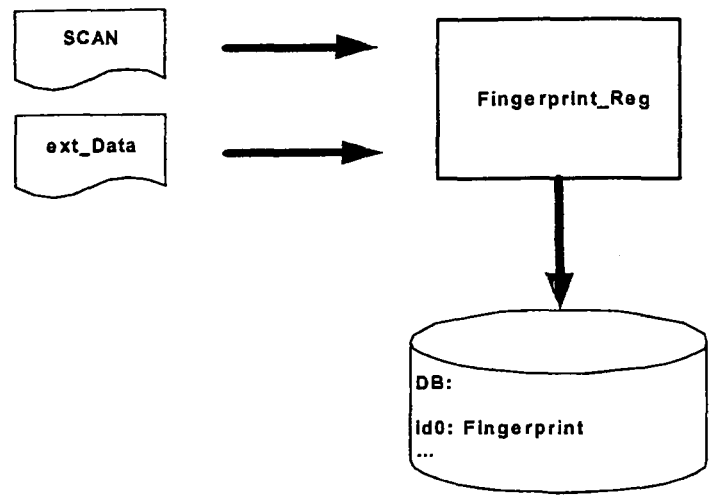
FIG. 1 shows the general principle of a registration.

FIG. 1 shows the principle of registration of at least one recognizable pictorial feature and by means of at least one external information item ext_Data, for example at the start of the sorting process for postal mailings.

The mailing is scanned in as a digital image SCAN for example for recognition of the pictorial feature. In a further registration step Fingerprint_Reg one or more pictorial features from the scanned image are recognized, extracted and registered as an identified feature in a database DB, in a feature vector id0: Fingerprint. The same applies to the registration of external information items ext_Data, which are registered in the feature vector id0: Fingerprint.

Figure 2:
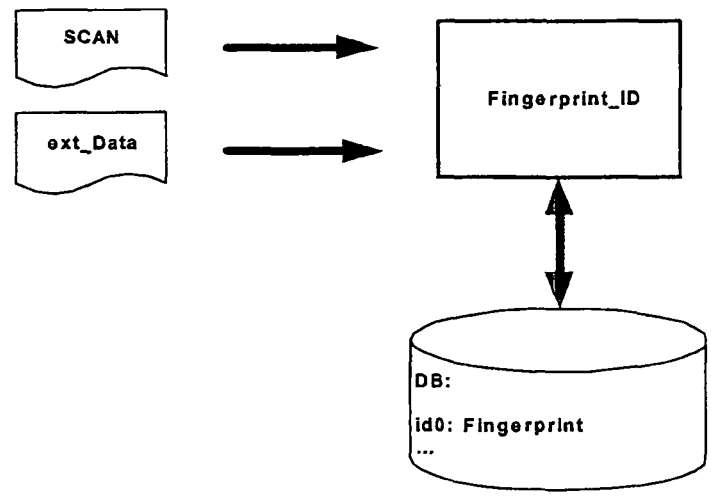
FIG. 2 shows the general principle of an identification.

FIG. 2 shows the principle of the inventive identification following the registration according to FIG. 1. This step takes place for example at one or more sorting points of a sorting center. As in FIG. 1 recognized pictorial features of the captured image SCAN are compared with registered data in the database DB by way of an identification step Fingerprint_ID. Feature vectors, whose features correspond to the pictorial features, in the database DB can be identified in this process. Should identification be incomplete however, better corresponding feature vectors in the database DB are searched for in the mailing using the further external information items ext_Data. The identification in the database therefore becomes increasingly narrow or selective, until it is finally successful with a high level of reliability.

Figure 3:
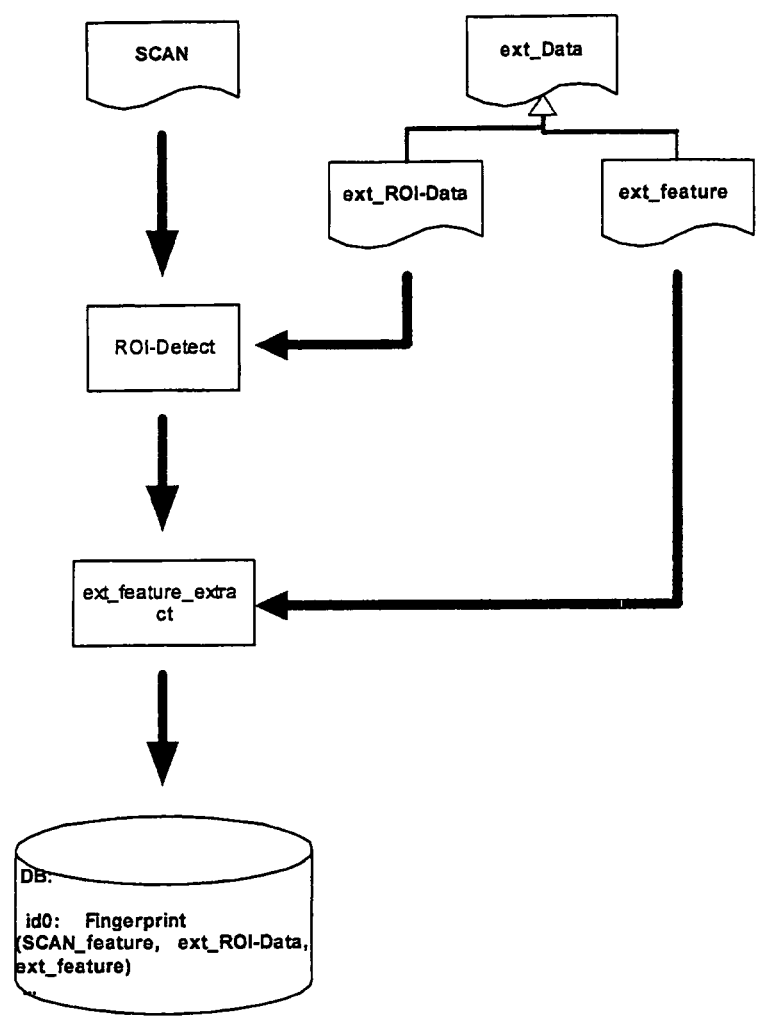
FIG. 3 shows a detailed example of a registration.

FIG. 3 also shows a detailed example of the registration according to FIG. 1. Here the external information ext_Data is divided into two registration information items. These are a location information item ext_ROI_Data to determine the position or region of a feature, e.g. to mark an address block, and a further external feature ext_feature such as a bar code. As well as registering the mailing by means of pictorial features SCAN_feature of the mailing image SCAN, registration is continued in steps using the further external information items ext_ROI_Data, ext_feature by detecting ROI_Detect the marking of the address block or by extracting ext_feature_ extract the further external feature ext_feature. A mailing-related feature vector id0: Fingerprint (SCAN_feature, ext_ROI_Data, ext_feature) is thus registered in the database DB.

Figure 4:
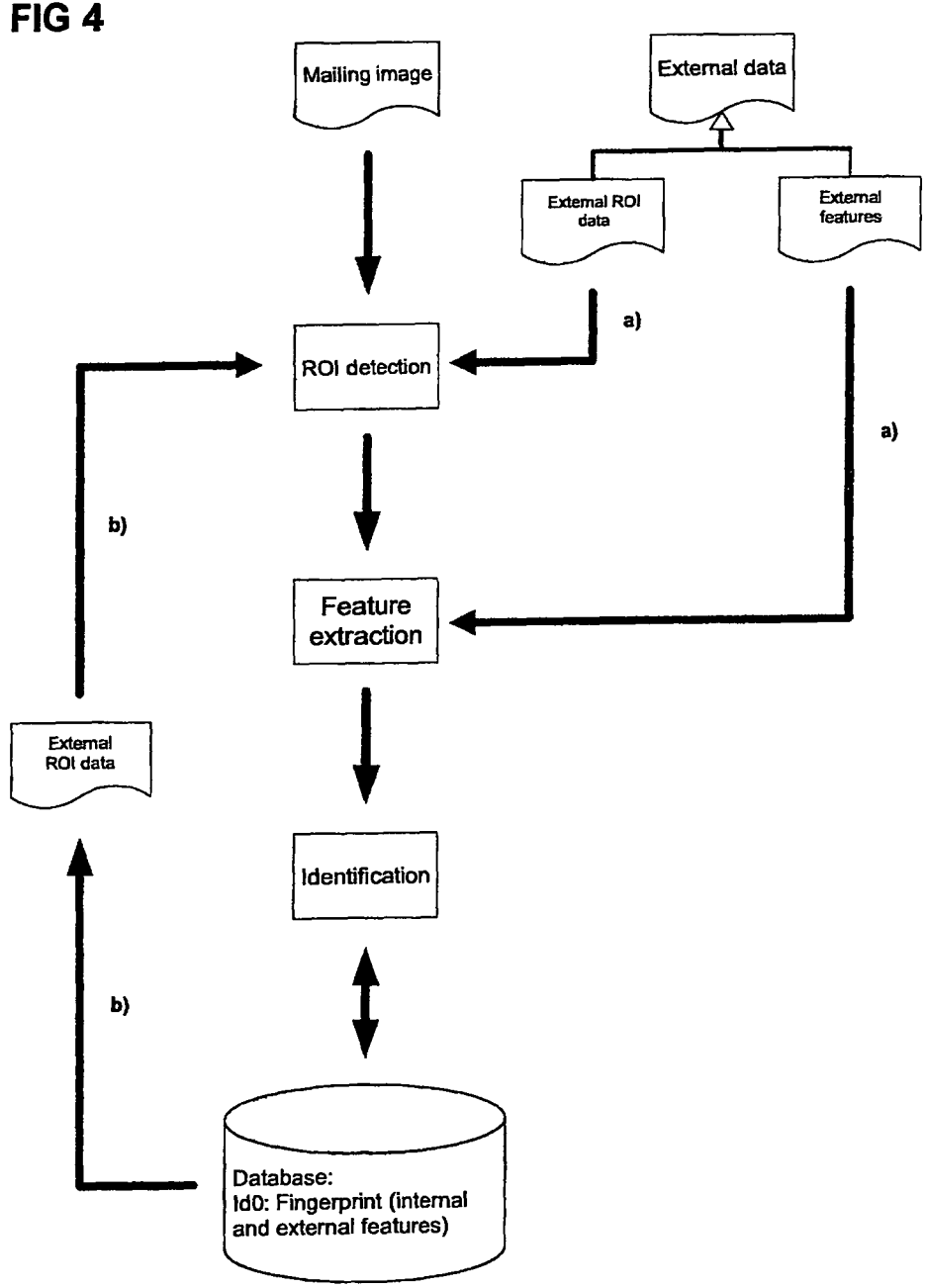
FIG. 4 shows a detailed example of an identification.

FIG. 4 shows a detailed example of the identification according to FIG. 2 based on the detailed example in FIG. 3. The pictorial features SCAN_feature detected from the mailing image SCAN and the external information items ext_ROI_Data, ext_feature extracted in some instances are searched for in the database using already registered feature vectors by way of an identification module Ident. The search takes place in such a manner that the feature vector id0: Fingerprint (SCAN_feature, ext_ROI_Data, ext_feature) corresponding to the features or information items is identified, if it comprises at least the complete pictorial features and the external information items from the mailing to be identified.

Redundant pictorial features and/or redundant external information items can likewise be used to enhance the reliability of the identification but at the cost of the speed of the identification.

The invention claimed is:

1. A method for identifying a postal mailing, comprising the steps of:
registering a mailing in a postal mailings identification system by at least one recognizable pictorial feature and at least one external information item;
in the postal mailings identification system, electronically performing a first recognition operation using the at least one recognizable pictorial feature to identify the mailing; and
if the first recognition operation fails to result in identification of the mailing, electronically performing a further identification step using the at least one external information item and the at least one pictorial feature.

2. The method of claim 1, wherein a manually inputted, external information item is used during registration.

3. The method of claim 2, wherein the external information item contains a discriminating feature of a mass mailing type.

4. The method of claim 2, wherein the external information item comprises a location of a recognizable feature.

5. The method of claim 1, wherein the external information item is recognized by machine during at least one of registration and identification.

6. The method of claim 5, wherein the external information item comprises a recognizable feature, preferably a text field, an ID code, a bar code or an RFID tag.

7. The method of claim 1, wherein the external information item recognizable during registration is stored in the database as a mailing-related feature vector fingerprint that is called up during the subsequent identification.

8. The method of claim 1, wherein changes, removals or additions on the mailing surface are taken into account as external information items or registered as new external information items between registration and identification.

9. The method of claim 6, wherein the recognizable feature includes one of a text field, an ID code, a bar code and an RFID tag.

10. The method of claim 8, wherein the additions on the mailing surface include at least one of a divert address, a bar code, a 2D code, an RFID code, a sticker and a stamp print.

11. The method of claim 8, wherein the changes, the removals or the additions on the mailing surface include a divert address, at least a bar code, at least a 2D code, an RFID code, at least a sticker, at least a stamp print, or a cancelation.

* * * * *